(12) United States Patent
Inokuchi

(10) Patent No.: US 10,220,647 B2
(45) Date of Patent: Mar. 5, 2019

(54) IMAGE DISPLAY DEVICE AND IMAGE DISPLAY MEDIUM

(71) Applicant: TOPPAN PRINTING CO., LTD., Tokyo (JP)

(72) Inventor: Masami Inokuchi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 202 days.

(21) Appl. No.: 15/219,132

(22) Filed: Jul. 25, 2016

(65) Prior Publication Data

US 2016/0332476 A1    Nov. 17, 2016

Related U.S. Application Data

(63) Continuation of application No. PCT/JP2015/052571, filed on Jan. 29, 2015.

(30) Foreign Application Priority Data

Jan. 29, 2014   (JP) .................................. 2014-014737

(51) Int. Cl.
*B42D 25/24*   (2014.01)
*B42D 25/328*  (2014.01)
(Continued)

(52) U.S. Cl.
CPC ........... *B42D 25/328* (2014.10); *B42D 25/24* (2014.10); *G02B 5/1842* (2013.01);
(Continued)

(58) Field of Classification Search
CPC .... B42D 25/328; B42D 25/24; G02B 5/1842; G03H 1/0011; G03H 1/0244;
(Continued)

(56) References Cited

U.S. PATENT DOCUMENTS

2004/0021945 A1\* 2/2004 Tompkin ................. G02B 5/18
                                                   359/566
2004/0223156 A1\* 11/2004 McGrew ............. G02B 5/1809
                                                   356/364
(Continued)

FOREIGN PATENT DOCUMENTS

CN     101727778      6/2010
JP     49-131142 A    12/1974
(Continued)

OTHER PUBLICATIONS

International Preliminary Report on Patentability for Application No. PCT/JP2015/052571, dated Aug. 2, 2016; English translation, 7 pages.

(Continued)

*Primary Examiner* — William R Alexander
(74) *Attorney, Agent, or Firm* — Squire Patton Boggs (US) LLP

(57) ABSTRACT

An image display device includes image cells arranged two-dimensionally. Each image cell has a hologram layer. The hologram layer includes a diffraction grating in which a one-dimensional grating pattern extending in a first direction is repeated in a second direction perpendicular to the first direction. Among the plurality of image cells, two or more image cells that are in a row in the second direction and correlated to one color constitute one image cell group. The image cell group includes a section in which the spatial frequency of the diffraction grating is proportionately small as the distance in the second direction from one end of the image cell group increases such that, while a viewpoint is positioned at a predetermined angle relative to an image display device, the two or more image cells constituting the image cell group display the same color as each other.

10 Claims, 5 Drawing Sheets

(51) Int. Cl.
*G09F 19/12* (2006.01)
*G03H 1/04* (2006.01)
*G03H 1/30* (2006.01)
*G02B 5/18* (2006.01)
*G03H 1/00* (2006.01)
*G03H 1/02* (2006.01)
*G03H 1/22* (2006.01)

(52) U.S. Cl.
CPC ......... *G03H 1/0011* (2013.01); *G03H 1/0244* (2013.01); *G03H 1/0493* (2013.01); *G03H 1/30* (2013.01); *G09F 19/12* (2013.01); *G03H 2001/0497* (2013.01); *G03H 2001/2271* (2013.01); *G03H 2210/54* (2013.01); *G03H 2250/10* (2013.01); *G03H 2250/42* (2013.01)

(58) Field of Classification Search
CPC ............... G03H 1/0493; G03H 1/30; G03H 2001/0497; G03H 2001/2271; G03H 2210/54; G03H 2250/10; G03H 2250/42; G09F 19/12
USPC ............................................................ 359/2
See application file for complete search history.

(56) References Cited

U.S. PATENT DOCUMENTS

| | | | | |
|---|---|---|---|---|
| 2007/0241553 A1* | 10/2007 | Heim | ................ | B42D 25/351 283/91 |
| 2009/0040580 A1 | 2/2009 | Mukawa | | |
| 2010/0172000 A1* | 7/2010 | Holmes | ................ | G03H 1/028 359/2 |
| 2010/0230615 A1* | 9/2010 | MacPherson | ............. | B44F 1/10 250/488.1 |
| 2010/0254007 A1* | 10/2010 | Toda | .................... | G02B 5/0221 359/567 |
| 2011/0007374 A1* | 1/2011 | Heim | ................... | G03H 1/0244 359/2 |
| 2011/0012337 A1* | 1/2011 | Heim | .................... | B42D 25/29 283/94 |
| 2011/0069360 A1* | 3/2011 | Dichtl | .................... | G07D 7/003 359/2 |
| 2013/0258477 A1* | 10/2013 | Lok | ...................... | G02B 5/1809 359/573 |
| 2015/0224809 A1* | 8/2015 | Tompkin | ............... | B42D 25/328 283/73 |
| 2015/0360501 A1* | 12/2015 | Van Den Berg | ..... | B42D 25/309 283/77 |

FOREIGN PATENT DOCUMENTS

| | | |
|---|---|---|
| JP | 10-49647 A | 2/1998 |
| JP | H11-5373 | 1/1999 |
| JP | 2002-226740 A | 8/2002 |
| JP | 2006-123174 A | 5/2006 |
| JP | 2006-350129 A | 12/2006 |
| JP | 2013-92683 A | 5/2013 |

OTHER PUBLICATIONS

Extended European Search Report dated Oct. 12, 2017, in European Patent Application No. 15742975.4, 10 pages.
International Search Report for Application No. PCT/JP2015/052571, dated Apr. 28, 2015, English translation.

* cited by examiner

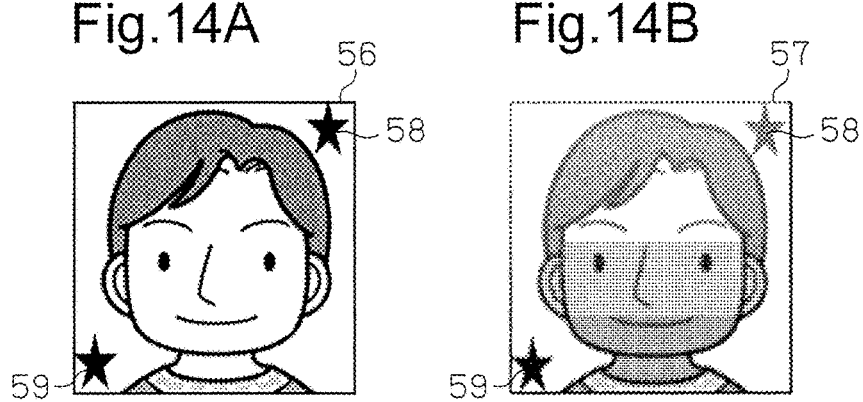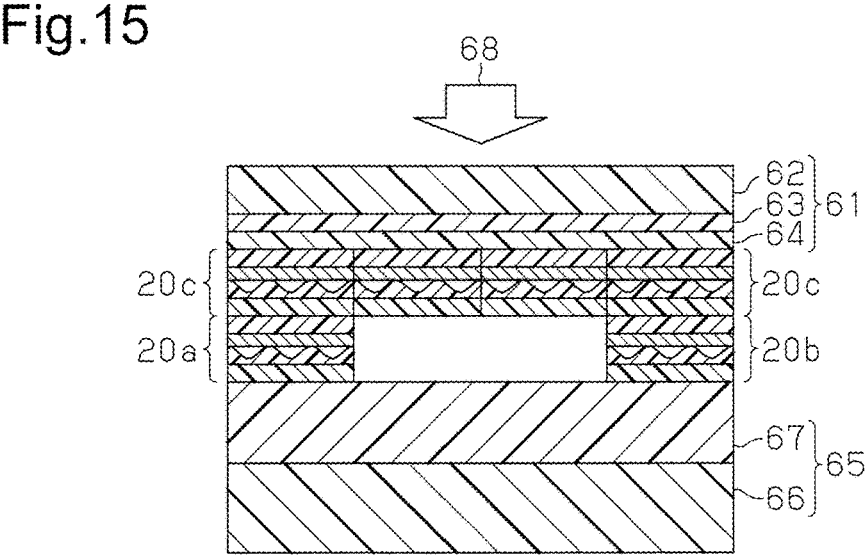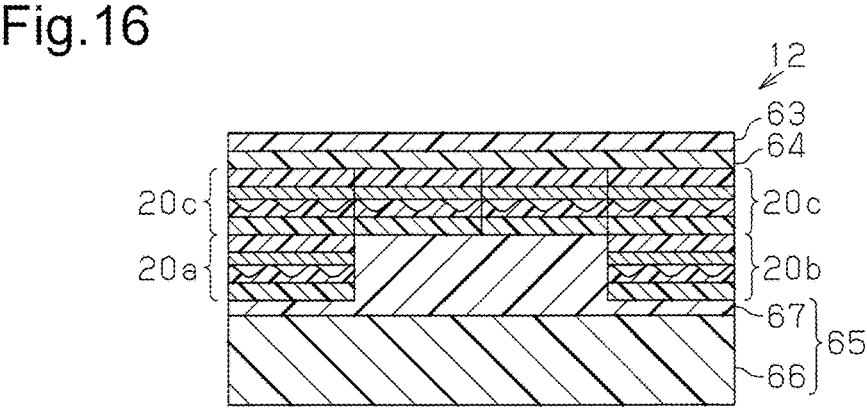

IMAGE DISPLAY DEVICE AND IMAGE DISPLAY MEDIUM

CROSS-REFERENCE TO RELATED APPLICATIONS

This application is a continuation of International Patent Application No. PCT/JP2015/052571, filed on Jan. 29, 2015, and published as WO/2015/115564 on Aug. 6, 2015, which international patent application claims priority to Japanese patent application no. 2014-014737, filed on Jan. 29, 2014.

BACKGROUND

The technologies of the present disclosure relate to an image display device for displaying images and an image display medium including the image display device.

A passport, which is an identity certification medium, includes a bearer display section displaying a face image of the bearer. When the face image is displayed by attaching a face photograph, the face image may be tampered by replacing the photograph. Thus, in recent years, a face image of the bearer has been formed on the sheet surface in the bearer display section instead of attaching a face photograph (see Japanese Laid-Open Patent Publication No. 2002-226740, Japanese Laid-Open Patent Publication No. 49-131142 and Japanese Laid-Open Patent Publication No. 2006-123174, for example). Further, optical variable device (OVD) technologies have been used effectively to limit fraud (see Japanese Laid-Open Patent Publication No. 10-49647, for example). Examples of the OVD technologies include an optical film that has a diffraction grating and is adhered onto a face image, and a face image generated by a hologram by thermally transferring a section of a hologram ribbon to a passport.

However, passports incorporating such OVD technologies are still susceptible to counterfeit, tampering or other frauds. Thus, technologies have been sought that allow easy verification of the authenticity of face images through visual check by a user. Easy verification of image authenticity is required not only for bearer display sections of passports but also for other image display devices that display images using OVD technologies.

SUMMARY

It is an objective of the technologies of the present disclosure to provide an image display device that allows easy verification of image authenticity through visual check and to provide an image display medium.

To achieve the foregoing objective, an image display device is provided that includes a plurality of image cells arranged two-dimensionally and each having a hologram layer. The hologram layer includes a diffraction grating in which a one-dimensional grating pattern extending in a first direction is located repeatedly in a second direction perpendicular to the first direction. Of the plurality of image cells, image cells that are aligned in the second direction and associated with a single color form a single image cell group. The image cell group includes a section in which a spatial frequency of the diffraction grating decreases as a distance from one end of the image cell group in the second direction increases such that the image cells forming the image cell group display a common color when a viewpoint is located at a predetermined angle relative to the image display device.

To achieve the foregoing objective, another image display device is provided that includes a plurality of image cells arranged two-dimensionally and including a hologram layer. The hologram layer includes a diffraction grating in which a one-dimensional grating pattern extending in a first direction is located repeatedly in a second direction perpendicular to the first direction. Of the plurality of image cells, image cells that are aligned in the second direction and associated with a single color form a first image cell group. The image cell group includes a section in which a spatial frequency $f$ of the diffraction grating of the image cell group and a wavelength $\lambda$ of light of the single color satisfy an equation (1) such that the image cells forming the image cell group display a common color when a viewpoint is located at a predetermined angle relative to the image display device.

$$f=(\sin \alpha - \sin \beta)/\lambda (\alpha > \beta) \tag{1}$$

where an incident angle $\alpha$ is an incident angle of illumination light relative to the image display device, and a diffraction angle $\beta$ is a diffraction angle of one of diffraction light beams diffracted by the diffraction patterns that passes through the viewpoint.

To achieve the foregoing objective, an image display medium is provided that includes an image display device that displays a face image of a bearer, wherein the image display device is one of the above described image display devices.

In the structures described above, a plurality of image cells forming an image cell group displays the same color. Thus, authenticity of image can be determined based on whether such a result is obtained through visual check.

BRIEF DESCRIPTION OF THE DRAWINGS

FIG. 14A is a diagram of a displayed image, showing an observation result of a face image displayed by a first image display section according to an example.

FIG. 14B is a diagram of a displayed image, showing an observation result of a face image displayed by a first image display section according to a comparative example.

FIG. 15 is a diagram showing a step in a method for manufacturing an image display device according to a modification.

FIG. 16 is a diagram showing a step in a method for manufacturing an image display device according to the modification.

DESCRIPTION OF EXEMPLARY EMBODIMENTS

Referring to FIGS. 1 to 14, one embodiment of an image display medium according to the technologies of the present disclosure will now be described. The image display medium is embodied as a passport.

Figure 1:
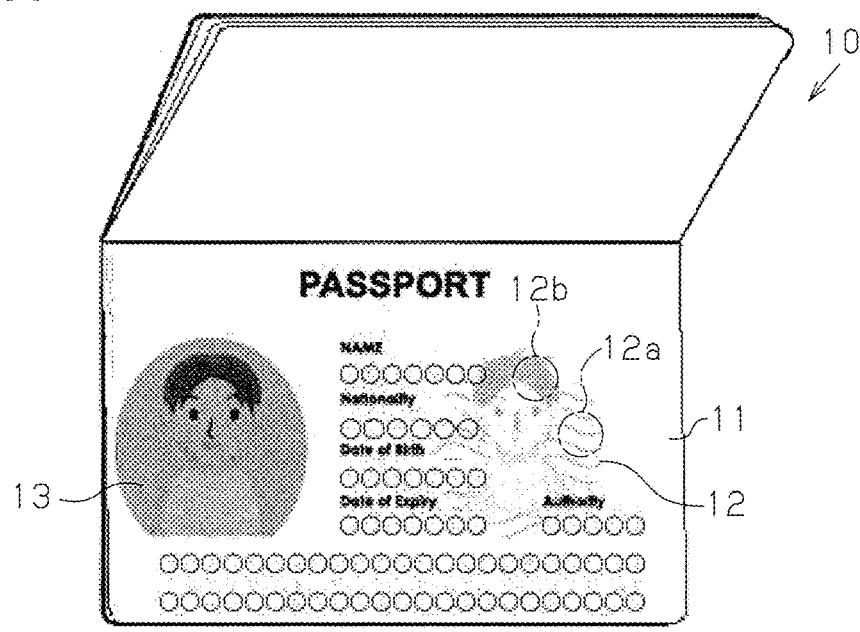
FIG. 1 is a perspective view of a passport of one embodiment of an image display medium according to the technologies of the present disclosure, when opened to show a page including a first and second image display sections.

As shown in FIG. 1, a passport 10 includes a first image display section 12, which is an example of an image display device, and a second image display section 13. The passport 10 includes a plurality of sheets 11 of paper bound to form the passport 10. Of the plurality of sheets 11 forming the passport 10, the first image display section 12 and the second image display section 13 are located on the sheet 11 indicating the identity of the bearer.

The first image display section 12 includes an optical device that displays a face image of the bearer on the sheet 11. The first image display section 12 records the face image of the bearer as the light amplitudes, light wavelengths, and light phases forming the bearer's face image. The first image display section 12 includes a hologram layer having a diffraction grating, which is an optical device. The first image display section 12 is formed through thermal transfer recording of a hologram sheet using a thermal head, hot stamping after thermal transfer recording using a thermal head, or thermal transfer recording using a heating roller. The first image display section 12 includes a single-layer display section 12a and a multilayer display section 12b.

The second image display section 13 includes pigments, dyes, or the like for displaying a face image of the bearer on the sheet 11. The second image display section 13 records the face image of the bearer as the light amplitudes and light wavelengths forming the bearer's face image. That is, the second image display section 13 is a printed section that exhibits the face image of the bearer using the light amplitudes and light wavelengths. The bearer's face image displayed by the second image display section 13 is identical in appearance to the face image displayed by the first image display section 12. The second image display section 13 is formed by a method such as thermal transfer recording using a thermal head, ink-jet recording, electrophotography, or a laser beam drawing that projects a laser beam onto a color development layer including a thermosensitive color former. Alternatively, the second image display section 13 may be formed by a combination of more than one methods described above.

The first image display section 12 preferably has an area that is 0.25 to 2 times the area of the second image display section 13, for example. When the area of the first image display section 12 is scaled as such relative to the area of the second image display section 13, the image displayed by the first image display section 12 and the image displayed by the second image display section 13 can be easily compared with each other, increasing the accuracy in comparison between the images. The ratio between the vertical length and the transverse length is preferably the same for both of the face image displayed by the first image display section 12 and the face image displayed by the second image display section 13. This also facilitates comparison between the images displayed by the first and second image display sections 12 and 13, increasing the accuracy in comparison between the images.

Figure 2:
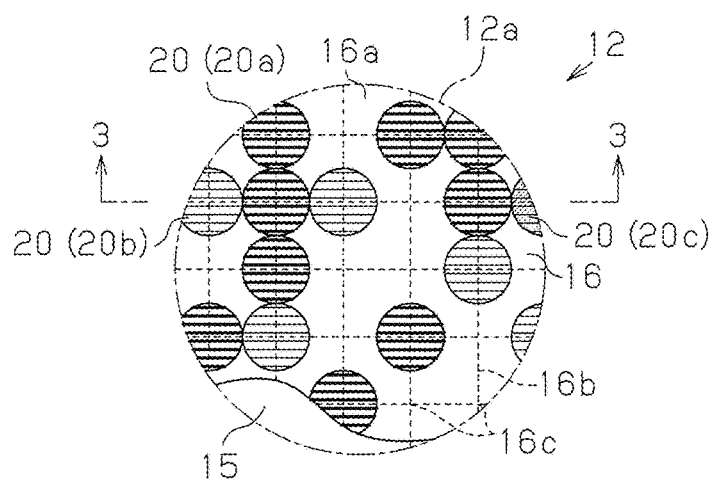
FIG. 2 is an enlarged plan view of a portion of the planar structure of a single-layer display section in the first image display section, with a part of an image reception layer removed for illustrative purposes.
Figure 3:
FIG. 3 is an enlarged cross-sectional view taken along line 3-3 in FIG. 2, showing a part of the cross-sectional structure of the single-layer display section in the first image display section.
Figure 4:
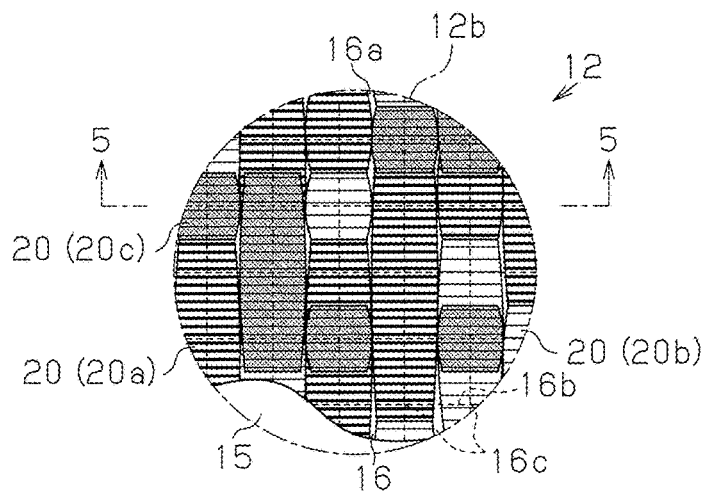
FIG. 4 is an enlarged plan view of a portion of the planar structure of a multilayer display section in the first image display section, with a part of an image reception layer removed for illustrative purposes.

Referring to FIGS. 2 to 5, the structure of the first image display section 12 will now be described. FIG. 2 is an enlarged plan view of the single-layer display section 12a in the first image display section 12 shown in FIG. 1. FIG. 4 is an enlarged plan view of the multilayer display section 12b in the first image display section 12 shown in FIG. 1.

As shown in FIG. 2, the section of the sheet 11 where the single-layer display section 12a is located includes a paper base 15 and an image reception layer 16, which covers the paper base 15. The image reception layer 16 is made of plastic having optical transparency.

In the single-layer display section 12a, a plurality of image cells 20 are arranged two-dimensionally on the surface 16a of the image reception layer 16. The plurality of image cells 20 includes first image cells 20a, second image cells 20b, and third image cells 20c. Each image cell 20 is minute and circular as viewed in a plan view of the surface 16a of the image reception layer 16. On the surface 16a of the image reception layer 16, the center of each image cell 20 is located on a lattice point 16c of a square lattice 16b, which is an imaginary planar lattice, as indicated by dotted lines in FIG. 2.

The first image cells 20a have relief structures, which record the light amplitudes, light wavelengths, and light phases forming the face image. In the relief structure, a grating pattern, which is a groove extending in the transverse direction, is located repeatedly in the vertical direction perpendicular to the transverse direction. The transverse direction is an example of a first direction, and the vertical direction is an example of a second direction. The first image cell 20a is a hologram element that diffracts light through the relief structure. First image cells 20a that are aligned in the vertical direction form a first image cell group.

The first image cell 20a has a spatial frequency that is set such that, when illumination light is incident on the first image cell 20a at a predetermined incident angle, light beams of a certain wavelength reinforce each other. For example, the first image cell 20a has a spatial frequency that reinforces light beams corresponding to red color and is thus associated with red color. The light beams corresponding to red color may be any beam that are visually perceived as having red color, such as a light beam having a single wavelength and a light beam having a band of wavelengths.

Further, the second image cells 20b have relief structures, which record the light amplitudes, light wavelengths, and light phases forming the face image. The relief structure of the second image cell 20b records a wavelength that differs from the wavelength of the relief structure of the first image cell 20a. Second image cells 20b that are aligned in the vertical direction form a second image cell group. The second image cell 20b has a spatial frequency that is set such that, when illumination light is incident on the second image cell 20b at a predetermined incident angle, light beams of a certain wavelength, which differs from the wavelength of the first image cell 20a, reinforce each other. For example, the second image cell 20b has a spatial frequency that reinforces light beams corresponding to green color and is thus associated with green color. The light beams corresponding to green color may be any beam that are visually perceived as having green color, such as a light beam having a single wavelength and a light beam having a band of wavelengths.

The third image cells 20c also have relief structures, which record the light amplitudes, light wavelengths, and light phases forming the face image. The relief structure of the third image cell 20c records a wavelength that differs from the wavelengths of the relief structures of the first and second image cells 20a and 20b. Third image cells 20c that are aligned in the vertical direction form a third image cell group. The third image cell 20c has a spatial frequency that is set such that, when illumination light is incident on the third image cell 20c at a predetermined incident angle, light beams of a certain wavelength, which differs from the wavelengths of the first and second image cells 20a and 20b, reinforce each other. For example, the third image cell 20c has a spatial frequency that reinforces light beams corresponding to blue color and is thus associated with blue color. The light beams corresponding to blue color may be any beam that are visually perceived as having blue color, such as a light beam having a single wavelength and a light beam having a band of wavelengths.

All of the image cells 20 aligned in the vertical direction each belong to the one of the first to third image cell groups. The authenticity of the image is determined based on whether each of the image cells 20 aligned in the vertical direction belongs to one of the three colors. Thus, compared to a structure that determines the authenticity of an image based on visual recognition of one color, the authenticity of the image can be verified with higher accuracy.

As shown in FIG. 3, image cells 20 that form the first image display section 12 is located on the surface 16a of the image reception layer 16 in the single-layer display section 12a. The image reception layer 16 bonds the image cells 20 to the paper base 15. On the surface 16a of the image reception layer 16, the image cells 20 define a single-layer cell region, which includes image cells 20, and a cell-free region, which is free of any image cell 20.

As shown in FIG. 4, the section on the sheet 11 where the multilayer display section 12b is located includes the paper base 15 and the image reception layer 16 in the same manner as the section including the single-layer display section 12a. In the multilayer display section 12b, image cells 20 are arranged two-dimensionally on the surface 16a of the image reception layer 16 in the same manner as the single-layer display section 12a. Each image cell 20 is substantially square as viewed in a plan view of the surface 16a of the image reception layer 16. As indicated by dotted lines in FIG. 4, image cells 20 are located on lattice points 16c of the square lattice 16b, which is an imaginary planar lattice. The multilayer display section 12b includes a section where image cells 20 of the same kind, first image cells 20a, second image cells 20b, or third image cells 20c, are arranged continuously in the vertical direction. The section where image cells 20 of the same kind are arranged continuously in the vertical direction has a shape of a vertical strip formed by the image cell 20 of the same kind.

Figure 5:
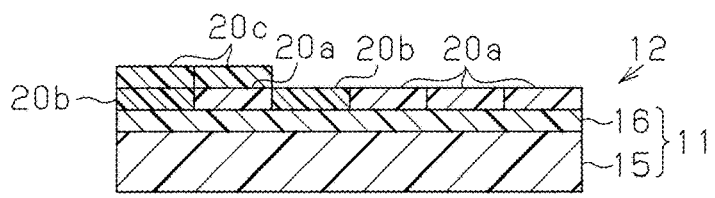
FIG. 5 is an enlarged cross-sectional view taken along line 5-5 in FIG. 4, showing a part of the cross-sectional structure of the multilayer display section in the first image display section.

As shown in FIG. 5, the multilayer display section 12b includes a section where two image cells 20 are layered. The layered image cells 20 may be of two different kinds among the first to third image cells 20a to 20c or of the same predetermined kind. FIG. 5 shows an example of a section where a third image cell 20c is overlaid on a second image cell 20b and a section where a third image cell 20c is overlaid on a first image cell 20a.

The imaginary planar lattice defining the positions of image cells 20 is not limited to the square lattice 16b and may be other lattice such as a triangle lattice or a rectangular lattice. The positions of image cells 20 that are adjacent to each other may be set such that the outlines of the image cells 20 are in contact with each other at one point, the image cells 20 overlap each other, or the outlines of the image cells 20 are separated from each other. The distance between the centers of adjacent image cells 20 is preferably 0.085 to 0.508 mm, or about 300 dpi to about 50 dpi. More preferably, the distance between the centers of adjacent image cells 20 may be 0.085 to 0.169 mm, or about 300 dpi to about 150 dpi. The distance between the centers of adjacent image cells 20 in such ranges provides a finer face image. Further, the distance between centers of adjacent image cells 20 in such ranges enhances the reproducibility of the face image displayed by the image cells 20.

Referring to FIGS. 6 to 9, the structure of the first image display section 12 will now be described in details, as well as its manufacturing method. First, a hologram ribbon 30 used to manufacture the first image display section 12 will be described.

Figure 6:
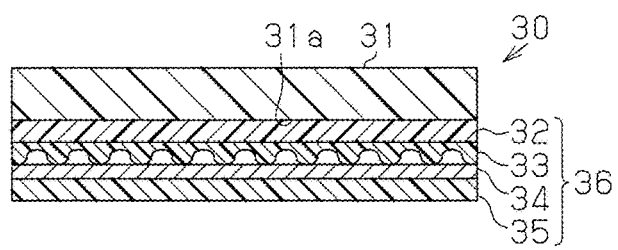
FIG. 6 is a cross-sectional view showing a cross-sectional structure of a hologram ribbon.

As shown in FIG. 6, the hologram ribbon 30 includes a carrier 31 in contact with a transfer element 36. The transfer element 36 is a multilayer structure including a peel-off protective layer 32, a minute unevenness formation layer 33, a transparent reflection layer 34, and an adhesive layer 35. The peel-off protective layer 32, the minute unevenness formation layer 33, and the transparent reflection layer 34 are sandwiched between the carrier 31 and the adhesive layer 35. The minute unevenness formation layer 33 is sandwiched between the peel-off protective layer 32 and the transparent reflection layer 34.

The carrier 31 is preferably a plastic film or a plastic sheet including a planar thin plastic plate, which is thicker than the plastic film and has a surface substantially larger than the thickness. The carrier 31 is preferably made of a material having a high heat resistance, such as polyethylene terephthalate. The carrier 31 includes a peel-off surface 31a, which is brought into contact with the peel-off protective layer 32. A release layer, which includes a fluorine resin or a silicone resin, for example, may be arranged between the peel-off surface 31a and the peel-off protective layer 32.

The peel-off protective layer 32, which is preferably transparent, has optical transparency and is made of a thermoplastic resin, for example. The peel-off protective layer 32 allows the transfer element 36 to be released from the carrier 31 in a stable manner and facilitates adhesion between image cells 20 and the image reception layer 16. In a manufacturing method in which releasability of the transfer element 36 from the carrier 31 and the adhesion between the image cells 20 and the image reception layer 16 are not required, the peel-off protective layer 32 may be omitted.

The minute unevenness formation layer 33 is a transparent layer having a higher optical transparency than the peel-off protective layer 32. The minute unevenness formation layer 33 is made of resin such as light curing resin, thermosetting resin, or thermoplastic resin, for example. The width direction of the hologram ribbon 30 corresponds to the vertical direction of image cells 20, and the longitudinal direction of the hologram ribbon 30 corresponds to the transverse direction of image cells 20. The minute unevenness formation layer 33 is a hologram element having a relief structure functioning as a diffraction grating on the surface. In the relief structure, a grating pattern, which is a groove extending in the longitudinal direction of the hologram ribbon 30, is located repeatedly in the width direction of the hologram ribbon 30.

In the relief structure of the minute unevenness formation layer 33, the spatial frequency, which is the number of grating patterns per unit length, defines the grating pattern pitch and determines the wavelength that is reinforced at the fixed point. The minute unevenness formation layer 33 records the wavelength of light forming the face image as a spatial frequency. Relief structures of mutually different spatial frequencies reinforce mutually different colors of light at the fixed point.

In the relief structure of the minute unevenness formation layer 33, the direction of grating pattern extension determines the direction in which constructive interference is visually perceived. The minute unevenness formation layer 33 records the phases of light forming the face image as the direction of grating pattern extension. Relief structures of mutually different directions of grating pattern extension create constructive interferences that are visually perceived from mutually different directions.

In the relief structure of the minute unevenness formation layer 33, the depth of the grating patterns determines the amount of light passing through the grating patterns. The minute unevenness formation layer 33 records the amplitudes of light forming the face image as the depth of the grating patterns. Relief structures of mutually different grating pattern depths create constructive interferences of mutually different degrees.

The transparent reflection layer 34 may be a transparent layer that differs in refractive index from the minute unevenness formation layer 33. For example, the transparent reflection layer 34 is formed by a vacuum film-forming method such as vacuum deposition or sputtering. The transparent reflection layer 34 increases the visibility of the face image but may be omitted if such visibility is not required. The transparent reflection layer 34 may include a single layer or multiple layers. When the transparent reflection layer 34 includes multiple layers, reflection and interference may be repeated within the transparent reflection layer 34. The transparent reflection layer 34 may be made of a transparent material including a transparent dielectric such as ZnS or TiO2. Alternatively, a metal layer having a thickness of 20 nm or less may be used as the transparent reflection layer 34. For example, such a metal layer may be made of chromium, nickel, aluminum, iron, titanium, silver, gold or copper.

The adhesive layer 35 formed on the surface of the transparent reflection layer 34 bonds the transparent reflection layer 34 to the surface of the transfer object 45. The material of the adhesive layer 35 may be thermoplastic resin such as polypropylene resin, polyethylene terephthalate resin, polyacetal resin, or polyester resin. The adhesive layer 35 is formed by adding inorganic particles, such as silica, to the resin. The solid fraction of the inorganic particles relative to the solvent is preferably 10 to 50. The adhesive layer 35 preferably has a layer thickness of 0.2 to 1.0 μm. The hologram ribbon 30, which will be transferred as a dot having a minute area or as a line having a minute width, requires good foil cutting characteristics. The adhesive layer 35 including inorganic particles has good foil cutting characteristics when transferring the hologram ribbon 30.

Figure 7:
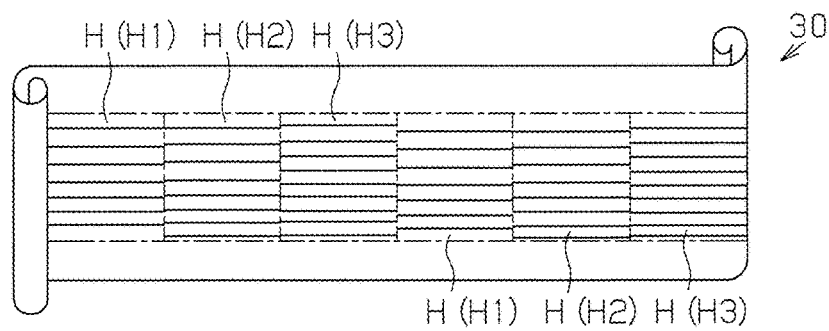
FIG. 7 is a plan view of a planar structure of the hologram ribbon, showing a position where minute unevenness formation layers are formed.

As shown in FIG. 7, the minute unevenness formation layer 33 of the hologram ribbon 30 includes minute unevenness formation sections H, which include first minute unevenness formation sections H1, second minute unevenness formation sections H2, and third minute unevenness formation sections H3. The first minute unevenness formation sections H1, second minute unevenness formation sections H2, and third minute unevenness formation sections H3 are arranged in sequence along the longitudinal direction of the hologram ribbon 30.

Each minute unevenness formation section H includes grating patterns extending in the longitudinal direction of the hologram ribbon 30. The grating patterns are aligned in the width direction of the hologram ribbon 30. The first minute unevenness formation section H1 is used to form a first image cell 20a, the second minute unevenness formation section H2 is used to form a second image cell 20b, and the third minute unevenness formation section H3 is used to form a third image cell 20c.

In FIG. 7, the upper end of the hologram ribbon 30 in the width direction corresponds to the upper end of the first image display section 12, and the lower end of the hologram ribbon 30 in the width direction corresponds to the lower end of the first image display section 12.

Figure 8:
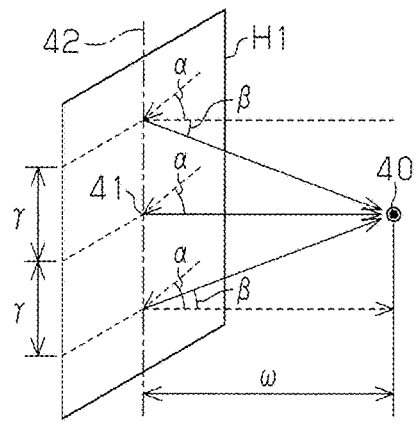
FIG. 8 is a geometric optical view showing the relationship between a light wavelength reinforced by a minute unevenness formation layer and a spatial frequency of the minute unevenness formation layer.

Referring to FIGS. 8 and 9, the structure of the minute unevenness formation section H will now be described. The second and third minute unevenness formation sections H2 and H3 are structured in the same manner as the first minute unevenness formation section H1 except that the colors of light intensified by the minute unevenness formation sections H2 and H3 differ from the color of the first minute unevenness formation section H1. That is, the first minute unevenness formation section H1 is structured such that an identical color, for example red, is visually perceived in the vertical direction when viewed from the fixed point. The second minute unevenness formation section H2 is structured such that an identical color, for example green, is visually perceived in the vertical direction when viewed from the fixed point. The third minute unevenness formation section H3 is structured such that an identical color, for example blue, is visually perceived in the vertical direction when viewed from the fixed point.

Thus, the description below will focus on the structure of the first minute unevenness formation section H1 and the difference between the first minute unevenness formation section H1 and the second and third minute unevenness formation sections H2 and H3. First, the relationship between the wavelength of light converging to the fixed point and the spatial frequency will be described referring to FIG. 8. Next, the structure of the first minute unevenness formation section H1 will be described referring to FIGS. 9A and 9B.

As shown in FIG. 8, the surface of the first minute unevenness formation section H1, which is shown as an imaginary plane, includes an imaginary reference point 41. A straight reference line 42 extends in the vertical direction through the reference point 41. The direction of the normal to the surface of the first minute unevenness formation section H1 is referred to as the direction of normal, which is perpendicular to the vertical and transverse directions.

The distance between the reference point 41 and the fixed point 40 is referred to as the observation distance co. The incident angle α is the angle of incidence of illumination light with respect to the observation angle. The diffraction angle β is the angle of diffraction light measured relative to the observation angle in the counter-clockwise direction. Diffraction angles β are positive values at positions above the reference point 41 on the reference line 42. Diffraction angles β are negative values at positions below the reference point 41 on the reference line 42. Further, the absolute value of diffraction angle β at each position on the reference line 42 increases as the distance from the reference point 41 increases. The distance between the reference point 41 and each point on the reference line 42 is referred to as the vertical distance γ.

The diffraction angle β, the vertical distance γ, and the observation distance ω of the first minute unevenness formation section H1 satisfy an equation (2) below. The spatial frequency f at each position on the reference line 42 and the wavelength λ of light converging to the fixed point 40 satisfy an equation (3) below.

$$\tan \beta = \gamma/\omega \quad (2)$$

$$f = (\sin \alpha - \sin \beta)/\lambda (\alpha > \beta) \quad (3)$$

The equation (3) shows that, when the incident angle α and the wavelength λ are fixed values, the spatial frequency f at each position on the reference line 42 depends on the diffraction angle β. The diffraction angle β continuously decreases from the upper end toward the lower end on the reference line 42. The diffraction angles β at positions above the reference point 41 are positive values, and the diffraction angles β at positions below the fixed point 40 are negative values. Accordingly, when the incident angle α and the wavelength λ are fixed values, the spatial frequency f at each position on the reference line 42 continuously decreases from the upper end toward the lower end.

Figure 9A:
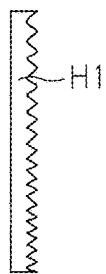
FIG. 9A is a side view of a minute unevenness formation layer schematically showing distribution of spatial frequency in the minute unevenness formation layer.
Figure 9B:
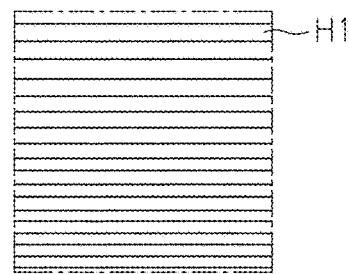
FIG. 9B is a plan view of a minute unevenness formation layer schematically showing distribution of spatial frequency in the minute unevenness formation layer.

As shown in FIGS. 9A and 9B, in a first minute unevenness formation section H1, a grating pattern extending in the transverse direction is located repeatedly in the vertical direction. The distance between grating patterns continuously decreases from the upper end toward the lower end. Accordingly, the spatial frequency f of the first minute unevenness formation section H1 decreases as the distance from the upper end increases and continuously decreases from the upper end toward the lower end. The spatial frequency f of the first minute unevenness formation section H1 continuously decreases from the upper end toward the lower end such that the wavelength obtained by the equation (3) is a wavelength of red light.

In addition to the continuous change from the spatial frequency f1 at the upper end to the spatial frequency f2 at the lower end, the spatial frequencies f may include frequency range Δf1 having the spatial frequency f1 as the center wavelength and the frequency range Δf2 having the spatial frequency f2 as the center wavelength. The spatial frequency ranges Δf1 and Δf2 are narrower when the first minute unevenness formation section H1 is a periodic diffraction grating that provides less scattering. The spatial frequency ranges Δf1 and Δf2 are wider when the first minute unevenness formation section H1 is a less periodic diffraction grating that provides more scattering. The narrower spatial frequency ranges Δf1 and Δf2 create diffraction light of vivid color but increase the change in the color of diffraction light when the incident angle α changes. When the first minute unevenness formation section H1 is a diffraction grating that provides scattering and thus the spatial frequency ranges Δf1 and Δf2 are wider, the change in the color of the diffraction light caused by any change in the incident angle α is reduced, thereby limiting change in the color.

The structure described above collects red light to the fixed point 40 when the incident angle α is fixed. The wavelength of red light may be the wavelength of light having a single wavelength, the wavelength of light having a band of wavelengths that provides a beam of the highest intensity, or the wavelength of light having a band of wavelengths that is the center wavelength in light intensity spectrum. The wavelength of red light is 650 nm, for example.

In a similar manner, the spatial frequency f of the second minute unevenness formation section H2 continuously decreases from the upper end toward the lower end such that the wavelength obtained by the equation (3) is a wavelength of green light.

In addition to the continuous change from the spatial frequency f1 at the upper end to the spatial frequency f2 at the lower end, the spatial frequencies f may include frequency range Δf1 having the spatial frequency f1 as the center wavelength and the frequency range Δf2 having the spatial frequency f2 as the center wavelength. The spatial frequency ranges Δf1 and Δf2 are narrower when the second minute unevenness formation section H2 is a periodic diffraction grating that provides less scattering. The spatial frequency ranges Δf1 and Δf2 are wider when the second minute unevenness formation section H2 is a less periodic diffraction grating that provides more scattering. The narrower spatial frequency ranges Δf1 and Δf2 create diffraction light of vivid color but increase the change in the color of diffraction light when the incident angle α changes. When the second minute unevenness formation section H2 is a diffraction grating that provides scattering and thus the spatial frequency ranges Δf1 and Δf2 are wider, the change in the color of the diffraction light caused by any change in the incident angle α is reduced, thereby limiting change in the color.

The wavelength of green light may be the wavelength of light having a single wavelength, the wavelength of light having a band of wavelengths that provides a beam of the highest intensity, or the wavelength of light having a band of wavelengths that is the center wavelength in light intensity spectrum. The wavelength of green light is 550 nm, for example.

The spatial frequency f of the third minute unevenness formation section H3 continuously decreases from the upper end toward the lower end such that the wavelength obtained by the equation (3) is a wavelength of blue light.

In addition to the continuous change from the spatial frequency f1 at the upper end to the spatial frequency f2 at the lower end, the spatial frequencies f may include frequency range Δf1 having the spatial frequency f1 as the center wavelength and the frequency range Δf2 having the spatial frequency f2 as the center wavelength. The spatial frequency ranges Δf1 and Δf2 are narrower when the third minute unevenness formation section H3 is a periodic diffraction grating that provides less scattering. The spatial frequency ranges Δf1 and Δf2 are wider when the third minute unevenness formation section H3 is a less periodic diffraction grating that provides more scattering. The narrower spatial frequency ranges Δf1 and Δf2 create diffraction light of vivid color but increase the change in the color of diffraction light when the incident angle α changes. When the third minute unevenness formation section H3 is a diffraction grating that provides scattering and thus the spatial frequency ranges Δf1 and Δf2 are wider, the change in the color of the diffraction light caused by any change in the incident angle α is reduced, thereby limiting change in the color.

The wavelength of blue light may be the wavelength of light having a single wavelength, the wavelength of light having a band of wavelengths that provides a beam of the highest intensity, or the wavelength of light having a band of wavelengths that is the center wavelength in light intensity spectrum. The wavelength of blue light is 450 nm, for example.

Figures 10A, 10B:
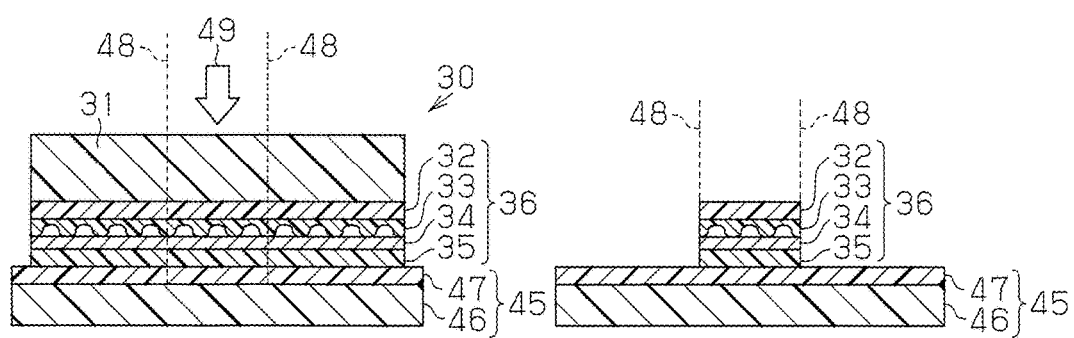
FIG. 10A is a cross-sectional view of a hologram ribbon in a process of transferring the hologram ribbon to a transfer object to form an image cell, showing a state where the hologram ribbon is in planar contact with the transfer object.
FIG. 10B is a cross-sectional view of a hologram ribbon in a process of transferring the hologram ribbon to a transfer object to form image cells, showing a state where an image cell is formed.
Figure 11:
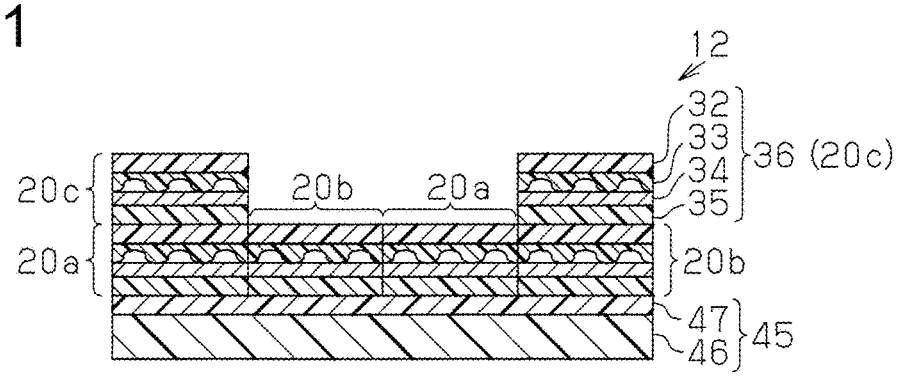
FIG. 11 is a cross-sectional view showing an example of cross-sectional structure of a first image display section.

Referring to FIGS. 10 and 11, an example method for forming patterns using a hologram ribbon 30 will now be described.

When forming patterns using the hologram ribbon 30, image data is first obtained to create a face image of the bearer. Then, a section of the hologram ribbon 30 is transferred onto a section of the transfer object 45.

As shown in FIG. 10A, the transfer object 45 includes a substrate 46 and an image reception layer 47 covering the substrate 46. The substrate 46 may be a paper base, plastic substrate, metal substrate, ceramic substrate, or glass substrate, for example.

When transferring the hologram ribbon 30, the hologram ribbon 30 is placed over the transfer object 45 such that the adhesive layer 35 is placed in contact with the surface of the transfer object 45. Then, heat pressure 49 is applied using a thermal head, for example, to the area delimited by two dotted lines 48 on the upper surface of the carrier 31. This bonds the adhesive layer 35 to the transfer object 45 in the area that has received the heat pressure 49. When peeling the hologram ribbon 30 off from the transfer object 45, the carrier 31 is peeled off from the peel-off protective layer 32, leaving the adhesive layer 35 adhered to the transfer object 45 in the area that has received the heat pressure 49.

As shown in FIG. 10B, only the section of the transfer element 36 in the hologram ribbon 30 that has received the heat pressure 49 is transferred to the surface of the transfer object 45. Each image cell 20 is thus formed by transferring a section of the transfer element 36 to a predetermined position on the surface of the transfer object 45.

As shown in FIG. 11, patterns of image cells 20a, 20b and 20c are formed on the transfer object 45 by repeating transfer of the transfer elements 36 of minute unevenness formation sections H1, H2 and H3 according to the image data. The first image cell group, which is a plurality of image cells 20a aligned in the vertical direction, is formed by a section of a single first minute unevenness formation section H1 that is continuous in the vertical direction. The second image cell group, which is a plurality of image cells 20b aligned in the vertical direction, is formed by a section of a single second minute unevenness formation section H2 that is continuous in the vertical direction. The third image cell group, which is a plurality of image cells 20c aligned in the vertical direction, is formed by a section of a single third minute unevenness formation section H3 that is continuous in the vertical direction.

Since the spatial frequency f of the first minute unevenness formation section H1 satisfies the equation (3) in the vertical direction, the spatial frequency f of the first image cell group also satisfies the equation (3) in the vertical direction. In the first image cell group thus formed, the spatial frequency f decreases as the distance from the upper end increases such that the wavelength λ obtained by the equation (3) is of red light. Further, in the section of the first image cell group where first image cells 20a are continuously arranged in the vertical direction, the spatial frequency f continuously decreases from the upper end toward the lower end of this section such that the wavelength λ obtained by the equation (3) is of red light.

Since the spatial frequency f of the second minute unevenness formation section H2 satisfies the equation (3) in the vertical direction, the spatial frequency f of the second image cell group also satisfies the equation (3) in the vertical direction. In the second image cell group thus formed, the spatial frequency f decreases as the distance from the upper end increases such that the wavelength λ obtained by the equation (3) is of green light. Further, in the section of the second image cell group where second image cells 20b are continuously arranged in the vertical direction, the spatial frequency f continuously decreases from the upper end toward the lower end of this section such that the wavelength λ obtained by the equation (3) is of green light.

Since the spatial frequency f of the third minute unevenness formation section H3 satisfies the equation (3) in the vertical direction, the spatial frequency f of the third image cell group also satisfies the equation (3) in the vertical direction. In the third image cell group thus formed, the spatial frequency f decreases as the distances from the upper end increases such that the wavelength λ obtained by the equation (3) is of blue light. Further, in the section of the second image cell group where third image cells 20c are continuously arranged in the vertical direction, the spatial frequency f continuously decreases from the upper end toward the lower end of this section such that the wavelength λ obtained by the equation (3) is of blue light.

Figure 12:
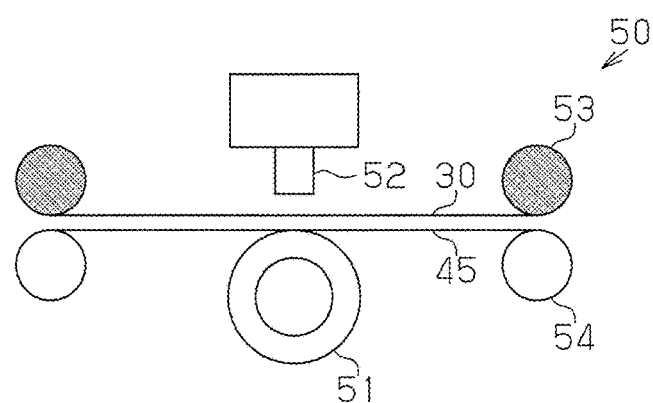
FIG. 12 is a diagram showing an example of the structure of a transfer apparatus.
Figure 13:
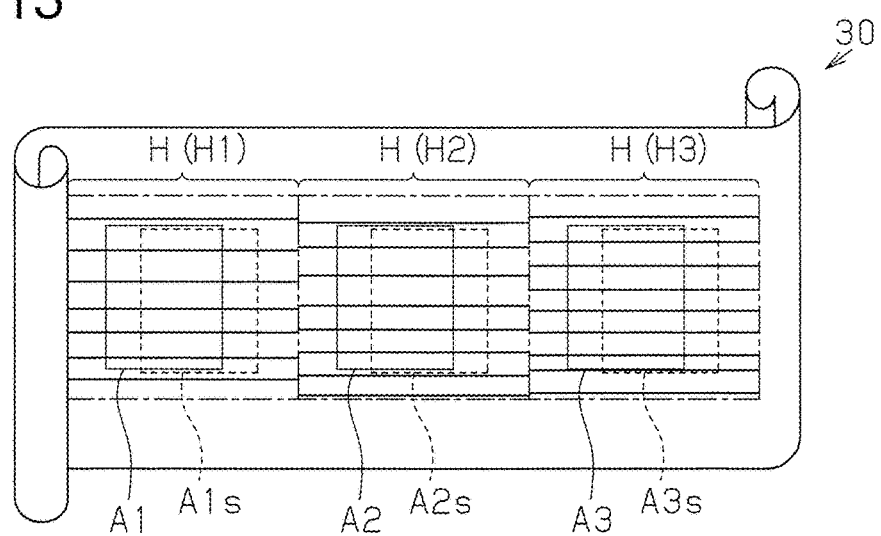
FIG. 13 is a plan view showing an example of areas to be transferred in a hologram ribbon.

Referring to FIGS. 12 and 13, the area of the hologram ribbon 30 to be transferred using a thermal head will now be described.

As shown in FIG. 12, a transfer apparatus 50 for transferring the hologram ribbon 30 to the transfer object 45 includes a transfer roller 51 and a thermal head 52, which are opposed to each other. The transfer apparatus 50 includes a ribbon transport mechanism 53, which moves the hologram ribbon 30 through the space between the transfer roller 51 and the thermal head 52, and a transfer object transport mechanism 54, which moves the transfer object 45 through the gap between the hologram ribbon 30 and the transfer roller 51 in the space between the transfer roller 51 and the thermal head 52. Based on the image data, the transfer apparatus 50 drives the transfer roller 51, the thermal head 52, the ribbon transport mechanism 53, and the transfer object transport mechanism 54 to successively transfer sections of minute unevenness formation sections H1, H2 and H3 to the transfer object 45 so that patterns of image cells 20a, 20b and 20c are formed on the transfer object 45.

As shown in FIG. 13, each of the minute unevenness formation sections H1, H2 and H3 has larger outer dimensions than the first image display section 12 in the longitudinal and width directions of the hologram ribbon 30. For example, the outer dimensions of the minute unevenness formation sections H1, H2 and H3 are 10 to 100 mm larger than the outer dimensions of the first image display section 12 described above.

Such a structure reduces the likelihood of transfer becoming impossible due to misalignment between the hologram ribbon 30 and the transfer object 45 caused when the hologram ribbon 30 is set to the ribbon transport mechanism 53 or when the transfer object 45 is set to the transfer object transport mechanism 54.

In the minute unevenness formation sections H1, H2 and H3, the spatial frequency is set to satisfy the equations (2)

and (3), that is, to collect light of a specific wavelength into the fixed point 40. Thus, even if the areas to be transferred in minute unevenness formation sections H1, H2 and H3 are displaced to transfer areas A1, A2 and A3 from reference transfer areas A1s, A2s and A3s, which are achieved when the hologram ribbon 30 is aligned with the transfer object 45, for example, the position of the fixed point 40 relative to the transfer areas will not be displaced to a large extent as long as transfer areas are located within the minute unevenness formation sections H1, H2 and H3.

Further, the spatial frequencies of the minute unevenness formation sections H1, H2 and H3 are set with respect to the vertical direction, that is, the width direction of the hologram ribbon 30. Therefore, any misalignment between the transfer object 45 and the hologram ribbon 30 in the longitudinal direction of the hologram ribbon 30 caused by deviation in the feed amount of the hologram ribbon 30 set to the ribbon transport mechanism 53 will not affect the position of the fixed point 40.

To achieve precise color expression at the fixed point 40, color correction is required in the transverse direction as well as in the vertical direction. Color correction in the transverse direction can be performed by modifying the diffraction grating to continuously change the direction of grating pattern extension in the diffraction grating and by limiting deviation in the feed amount of the ribbon transport mechanism 53. On the other hand, since the position of the hologram ribbon 30 tends to deviate in the longitudinal direction of the hologram ribbon 30, it is desirable that color correction in the transverse direction be performed by image processing instead of changing the design of minute unevenness formation sections H1, H2 and H3. In other words, if the position of a formed image is displaced in the transverse direction causing shifts in diffraction wavelengths of the minute unevenness formation sections H1, H2 and H3 and color shifts of three colors of red, green, and blue, it is desirable such color shifts be corrected by image processing. That is, color correction in the vertical direction is desirably achieved by adjusting the spatial frequencies of the minute unevenness formation sections H, and color correction in the transverse direction is desirably achieved by image processing. As such, any deviation in the feed amount of the hologram ribbon 30 during transfer will not shift the colors in the first image display section 12. Further, such a structure allows the first image display section 12 to display an image that is free of a vertical or horizontal color shift at the fixed point 40.

FIG. 14A shows an observation image 56 that is an example of a face image generated by the first image display section 12. FIG. 14B shows an observation image 57 that is an example of a face image generated by an image display section in which, unlike the first image display section 12, the spatial frequency f is uniform in the vertical direction.

As shown in FIGS. 14A and 14B, since the image cells 20a, 20b and 20c collect light of respective wavelengths into the fixed point 40 for the observation image 56, the hue of the skin over the area from the forehead to the chin in the face image does not vary significantly when the first image display section 12 is viewed from a certain direction. In contrast, since the image cells do not collect light of a specific wavelength into the fixed point 40 for the observation image 57, the hue of the skin varies significantly over the area from forehead to chin in the face image when the image display section is viewed from a certain direction. Further, when marks 58 and 59 of a set color are located at the upper and lower ends of the observation image 56, the marks 58 and 59 in the observation image 56 are visually perceived to have the same color at the fixed point 40, whereas the marks 58 and 59 in the observation image 57 are visually perceived to have different colors at the fixed point 40. The authenticity of the first image display section 12 and thus any tampering with the passport 10 can be easily determined by viewing the colors of the face image and the marks.

EXAMPLE

A hologram ribbon 30 was formed as follows. A polyethylene terephthalate film having a thickness of 12 µm was used as a carrier 31. A peel-off protective layer 32 and then a thermoplastic resin layer were formed on the carrier 31 using a gravure coater and dried in an oven. The peel-off protective layer 32 was made of an acrylic resin, and the thermoplastic resin layer was made of an acrylic polyol. The dried peel-off protective layer 32 had a thickness of 0.6 µm, and the dried thermoplastic resin layer had a thickness of 0.7 µm.

Then, heat pressing was performed using a roller embossing apparatus to form minute unevenness formation sections H1, H2 and H3 as holograms on the surface of the thermoplastic resin layer. Each of the minute unevenness formation sections H1, H2 and H3 measured 50 mm by 50 mm and had a depth of about 100 nm. The spatial frequency f of the first minute unevenness formation section H1 was 1020 to 1275 lines/mm, the spatial frequency f of the second minute unevenness formation section H2 was 1205 to 1505 lines/mm, and the spatial frequency f of the third minute unevenness formation section H3 was 1470 to 1840 lines/mm. The spatial frequencies f changed continuously to increase as the distance from the lower end decreases. The spatial frequency f of the first minute unevenness formation section H1 was set with respect to a wavelength of 650 nm of red light. The spatial frequency f of the second minute unevenness formation section H2 was set with respect to a wavelength of 550 nm of green light. The spatial frequency f of the third minute unevenness formation section H3 was set with respect to a wavelength of 450 nm of blue light.

Then, a transparent reflection layer 34 made of zinc sulfide was formed on the minute unevenness formation layer 33 by vapor deposition. The thickness of the transparent reflection layer 34 was 50 nm. A polyester resin, which was a thermoplastic resin, was printed onto the transparent reflection layer 34 to form an adhesive layer 35 having a thickness of 0.6 µm.

Using the hologram ribbon 30 described above, a first image display section 12 was formed as follows.

A plastic card was used for a substrate 46 of a transfer object 45. An image reception layer 47 was formed on the substrate 46 using a gravure coater and dried in an oven. The image reception layer 47 was made of acrylic polyol. The thickness of the dried image reception layer 47 was 2.0 µm.

Based on the image data of image processing for displaying the face image in R, G and B, that is, three colors of red, green and blue, the image cells 20a, 20b and 20c were transferred from the carrier 31 to the image reception layer 47 by performing thermal transfer using a thermal head of 300 dpi.

The image cells 20a, 20b and 20c were transferred as follows. First, a first minute unevenness formation section H1 in the hologram ribbon 30 was placed in the space between the transfer roller 51 and the thermal head 52, and image cells 20a were printed onto positions associated with red color in the image data to form dots or lines. Then, a second minute unevenness formation section H2 was moved to the space between the transfer roller 51 and the thermal head 52, and image cells 20b were printed onto positions associated with green color in the image data to form dots or lines. Further, a third minute unevenness formation section H3 was moved to the space between the transfer roller 51 and the thermal head 52, and image cells 20c were printed onto positions associated with blue color in the image data to form dots or lines. The printing area, which was the area of each image cell 20, included two sizes: the largest size that did not cause overlapping between image cells 20 adjacent to each other in the transverse direction; and half the size of the largest size. The first image display section 12 of the Example was obtained as described above.

COMPARATIVE EXAMPLE

As a comparative example, a hologram ribbon 30 that was generally the same as the hologram ribbon 30 of the Example but differed in the spatial frequencies f of the minute unevenness formation sections was used to form a first image display section 12. In this comparison example, the spatial frequency f of a first minute unevenness formation section H1 was 1150 lines/mm, the spatial frequency f of a second minute unevenness formation section H2 was 1350 lines/mm, and the spatial frequency f of a third minute unevenness formation section H3 was 1650 lines/mm. That is, the spatial frequency f was uniform in each of the minute unevenness formation sections H1, H2 and H3.

The first minute unevenness formation section H1 was for red light, the second minute unevenness formation section H2 was for green light, and the third minute unevenness formation section H3 was for blue light. The hologram ribbon of the comparative example was used to form a first image display section 12 on a transfer object 45 based on the same image data as the example. The first image display section 12 according to the comparative example was thus formed.

Illumination light was shone onto the first image display section 12 of the example and the first image display section 12 of the comparative example at an incident angle of 40°, and each first image display section 12 was viewed from a distance of 30 cm to observe the image displayed by the first image display section 12. With the first image display section 12 of the example, the hue of the skin did not vary between the upper and lower ends of the face image, and the skin was visually perceived in the same hue over the entire face image. In contrast, with the first image display section 12 of the comparative example, although the center section of the face image was visually perceived to have a skin color, the upper and lower sections were visually perceived to have colors different from the skin color.

The above embodiment has the following advantages.

(1) When the first image display section 12 is viewed from the fixed point 40, the first image cell group exhibits red color, the second image cell group exhibits green color, and the third image cell group exhibits blue color. The authenticity of the face image of the first image display section 12 can be determined based on whether such an observation result is obtained. This facilitates visual check by a person checking the authenticity of the first image display section 12.

(2) The image cells 20a, 20b and 20c are designed to provide mutually different wavelengths. This allows the image observed at the fixed point 40 to be in color or in full color. As a result, the flexibility of the image that can be displayed by the first image display section 12 is increased, facilitating determination of the authenticity of the image displayed by the first image display section 12.

The authenticity of the image is determined based on whether the first image cell group is visually perceived to have red color and whether the second image cell group is visually perceived to have green color in the first image display section 12. This improves the accuracy in determination of the authenticity of image compared to a structure in which only one color is viewed to determine the authenticity of image.

Further, the authenticity of image can be determined based on whether the first to third image cell groups are visually perceived to have mutually different colors. This improves the accuracy in determination of the authenticity of image compared to a structure in which only one color is viewed to determine the authenticity of image.

(3) The image cells 20a, 20b and 20c are selectively layered. This allows the first image display section 12 to display a finer image. That is, the first image display section 12 in which image cells 20a, 20b and 20c overlap with other image cells 20a, 20b and 20c can display a finer image.

(4) The passport 10 includes the first image display section 12 and the second image display section 13. Thus, the authenticity of the face image displayed by the first image display section 12 can be determined by comparison between the face images displayed by the first and second image display sections 12 and 13. Since the first and second image display sections 12 and 13 are on the same sheet surface, the face images displayed by the first and second image display sections 12 and 13 can be easily compared with each other, improving accuracy in the comparison between the first and second image display sections 12 and 13.

(5) The area of the first image display section 12 is 0.25 to 2 times the area of the second image display section 13. This structure avoids difficulties in the comparison between the face images displayed by the first and second image display sections 12 and 13 and thus facilitates the comparison. In addition, this structure limits degradation in the accuracy in the personal identification.

(6) The grating patterns of the minute unevenness formation sections H1, H2 and H3 extend in the longitudinal direction of the hologram ribbon 30, which is the movement direction of the hologram ribbon 30. Thus, any positional deviation in the movement direction of the hologram ribbon 30 during transfer of image cells 20a, 20b and 20c will not significantly displace the position of the fixed point 40 relative to the image cells 20a, 20b and 20c.

The above embodiment may be modified as follows.

For example, as long as the passport 10 includes the first image display section 12, the first image display section 12 and the second image display section 13 may be located on separate sheet surfaces, or the second image display section 13 may be omitted.

The image displayed by the first image display section 12 can have a plurality of colors simply by arranging image cells 20a, 20b and 20c on a single plane without layering them.

The image displayed by the first image display section 12 does not have to be a color image having a plurality of colors. For example, the first image display section 12 may be formed only by image cells 20 associated with a single color.

As long as an image cell group includes a section where the spatial frequency f decreases as the distance from one end of the image cell group in the direction perpendicular to the direction of grating pattern extension increases, the image cell group may include a section where the spatial frequency f increases as the distance from one end of the image cell group increases or a section where the spatial frequency f is uniform.

As for the section where the spatial frequency f decreases as the distance from one end of the image cell group increases, an image cell group may be structured such that image cells 20 that are at greater distances from one end of the image cell group in the direction perpendicular to the direction of grating pattern extension have smaller spatial frequencies f. Alternatively, in one image cell group, a predetermined number of image cells 20 aligned in the direction perpendicular to the direction of grating pattern extension may form an image cell block, and image cell blocks that are at greater distances from one end of the image cell group in the direction perpendicular to the direction of grating pattern extension have smaller spatial frequencies f. Further, spatial frequencies f of an image cell group may be set by a combination of any two or more structures selected from the structures described above.

Referring to FIGS. 15 and 16, a modification of a method for forming an image display device on a sheet will now be described. In the following method, a plurality of image cell is first formed on a first transfer element and then transferred to a sheet that functions as a second transfer element to form an image display device on the sheet.

As shown in FIG. 15, a first transfer object 61 is a lamination of a substrate 62, a peel-off protective layer 63, and an image reception layer 64. The second transfer object 65 is a lamination of a substrate 66 and an image reception layer 67.

In the first transfer object 61, the substrate 62 is, for example, a plastic film or a plastic sheet including a planar plastic thin plate that is thicker than the plastic film and has a surface sufficiently large relative to its thickness. The substrate 62 is made of a material with excellent heat resistance, such as polyethylene terephthalate. The peel-off protective layer 63 is overlaid on the substrate 62. The peel-off protective layer 63 allows releasing from the substrate 62 in a stable manner and facilitates adhesion of the image cells 20a, 20b and 20c to the image reception layer 67 of the second transfer object 65. The peel-off protective layer 63 has an optical transparency and is typically transparent. The image reception layer 64 enhances adhesion between the substrate 62 and the image cells 20a, 20b and 20c.

In the second transfer object 65, the substrate 66 is, for example, a plastic film or a plastic sheet including a planar plastic thin plate that is thicker than the plastic film and has a surface sufficiently large relative to its thickness. The substrate 66 is made of a material with excellent heat resistance, such as polyethylene terephthalate. The image reception layer 67 enhances adhesion between the substrate 66 and the image cells 20a, 20b and 20c. The image cells 20a, 20b and 20c that have been formed on the first transfer object 61 are brought into contact with the image reception layer 67 of the second transfer object 65 and subjected to heat pressure 68.

As shown in FIG. 16, when the substrate 62 of the first transfer object 61 is peeled off, the lamination of the first transfer object 61 excluding the substrate 62 is transferred as a transfer element to the second transfer object 65. This thermal transferring may be performed using a hot stamp, a heat roller, or a thermal head.

The first image display section 12 may be formed by performing necessary processing steps after thermally transferring the lamination to the second transfer object 65. In this method, the image cells 20a, 20b and 20c are formed on the first transfer object 61, reducing likelihood that any surface roughness of the sheet 11 affects the quality of the image displayed by the first image display section 12.

The sheet 11 is not limited to a paper base and may be a plastic substrate, a metal substrate, a ceramic substrate or a glass substrate.

The image displayed by the image display device may include other biometric data in addition to or instead of a face image. Further, the image displayed by the image display device may include at least one of non-biometric data and non-personal identification information in addition to or instead of biometric data.

The image displayed by the image display device is not limited to a face image of the bearer and may be a character, a number, a symbol, a diagram, a pattern or a combination thereof.

The method for forming image cells 20 is not limited to transferring of the minute unevenness formation layer 33. Image cells 20 may be directly formed on the sheet 11.

The image display medium is not limited to the passport 10 and may be a credit card, a driver's license, an employment card, an identification card such as a membership card, an admission ticket for school entrance examination, a passport, a bank note, a credit deposit ticket, a discount card, a stock certificate, a bill, a lottery ticket, a betting ticket, a bankbook, a transportation ticket, a traffic ticket, an airline ticket, an admission tickets for various events, a play facility ticket, prepaid cards for transportation or public phone, and the like.

The invention claimed is:

1. An image display device comprising a plurality of image cells arranged two-dimensionally and each comprising a hologram layer, the hologram layer including a diffraction grating in which a one-dimensional grating pattern extending in a first direction is located repeatedly in a second direction perpendicular to the first direction, and the plurality of image cells comprises a first image cell group, a second image cell group, and a third image cell group, each of the first, second, and third image cell groups comprising image cells that are aligned in the second direction and associated with a single color, and each of the first, second, and third image cell groups includes a section in which a spatial frequency of the diffraction grating decreases as a distance from one end of the image cell group in the second direction increases such that the image cells forming the image cell group display a common color when a viewpoint is located at a predetermined angle relative to the image display device;

and the first image cell group comprises image cells that are associated with a first color so that each of the image cells forming the first image cell group displays the first color when the viewpoint is located at the predetermined angle relative to the image display device;

the second image cell group comprises image cells that are associated with a second color so that each of the image cells forming the second image cell group displays the second color when the viewpoint is located at the predetermined angle relative to the image display device, and the third image cell group comprises image cells that are associated with a third color so that each of the image cells forming the third image cell group displays the third color when the viewpoint is located at the predetermined angle relative to the image display device.

2. The image display device according to claim 1, wherein of the plurality of image cells, for all of the image cells aligned in the second direction each image cell belongs to the first image cell group, the second image cell group, or the third image cell group.

3. The image display device according to claim 1, wherein each of the image cells includes a portion that overlaps with another image cell.

4. An image display medium comprising an image display device that displays a face image of a bearer, wherein the image display device is the image display device according to claim 1.

5. The image display medium according to claim 4, wherein
the image display device is a first image display section, and
the image display medium further includes a second image display section that is a printed section expressing a face image of the bearer with light wavelengths and light amplitudes.

6. The image display medium according to claim 5, wherein an area of the first image display section is 0.25 to 2 times an area of the second image display section.

7. An image display device comprising a plurality of image cells arranged two-dimensionally and including a hologram layer, the hologram layer including a diffraction grating in which a one-dimensional grating pattern extending in a first direction is located repeatedly in a second direction perpendicular to the first direction, wherein
the plurality of image cells, comprising a first image cell group, a second image cell group, and a third image cell group, each image cell group comprising image cells that are aligned in the second direction and associated with a single color, and
each image cell group includes a section in which a spatial frequency f of the diffraction grating of the image cell group and a wavelength λ of light of the single color satisfy an equation (1):

$$f = (\sin \alpha - \sin \beta)/\lambda \, (\alpha > \beta) \quad (1)$$

such that the image cells forming the image cell group display a common color when a viewpoint is located at a predetermined angle relative to the image display device, where
an incident angle α is an incident angle of illumination light relative to the image display device, and
a diffraction angle β is a diffraction angle of one of diffraction light beams diffracted by the diffraction grating patterns that passes through the viewpoint;
and the first image cell group comprises image cells that are associated with a first color and the first image cell group comprises a section in which the spatial frequency f of the diffraction grating of the first image cell group and the wavelength λ of light of the first color satisfy the equation (1),
and the second image cell group comprises image cells that are associated with a second color and the second image cell group comprises a section in which the spatial frequency f of the diffraction grating of the second image cell group and the wavelength λ of light of the second color satisfy the equation (1),
and the third image cell group comprises image cells that are associated with a third color and the third image cell group comprises a section in which the spatial frequency f of the diffraction grating of the third image cell group and the wavelength λ of light of the third color satisfy the equation (1).

8. An image display medium comprising an image display device that displays a face image of a bearer, wherein the image display device is the image display device according to claim 7.

9. The image display medium according to claim 8, wherein
the image display device is a first image display section, and
the image display medium further includes a second image display section that is a printed section expressing a face image of the bearer with light wavelengths and light amplitudes.

10. The image display medium according to claim 9, wherein an area of the first image display section is 0.25 to 2 times an area of the second image display section.

* * * * *